US006968898B2

(12) United States Patent
Todd et al.

(10) Patent No.: US 6,968,898 B2
(45) Date of Patent: Nov. 29, 2005

(54) SYSTEM AND METHOD FOR REMOVING PARTICLES FROM A WELL BORE PENETRATING A POSSIBLE PRODUCING FORMATION

(75) Inventors: Bradley L. Todd, Duncan, OK (US); Donald L. Whitfill, Kingwood, TX (US); Jimmie B. Lawson, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/185,910

(22) Filed: Jun. 28, 2002

(65) Prior Publication Data

US 2004/0000434 A1 Jan. 1, 2004

(51) Int. Cl.⁷ ..................... E21B 21/14; E21B 31/03; C09K 7/02
(52) U.S. Cl. ................ 166/311; 166/312; 166/300; 175/65; 507/142; 507/203; 507/270; 507/271; 507/925
(58) Field of Search ........................ 166/311, 312, 300, 166/307, 305.1, 304; 175/64, 65, 66; 507/200, 507/269, 270, 271, 203, 927, 925

(56) References Cited

U.S. PATENT DOCUMENTS

| | | | |
|---|---|---|---|
| 2,011,579 A * | 8/1935 | Heath et al. ............... 252/193 |
| 2,234,790 A | 3/1941 | Zacher ..................... 166/21 |
| 2,245,886 A | 6/1941 | Weir et al. .................. 255/1 |
| 2,425,415 A * | 8/1947 | Bond et al. ................. 166/307 |
| 2,435,211 A * | 2/1948 | Gillet ........................ 507/142 |
| 2,605,221 A | 7/1952 | Heoppel .................... 252/8.5 |
| 3,022,823 A * | 2/1962 | Caldwell et al. .......... 166/291 |
| 3,639,233 A * | 2/1972 | Schultz et al. ............ 507/126 |
| 3,675,717 A | 7/1972 | Goins, Jr. et al. ......... 166/278 |
| 3,804,760 A | 4/1974 | Darley ................... 252/8.55 R |
| 3,878,110 A * | 4/1975 | Miller et al. .............. 507/111 |
| 4,175,042 A | 11/1979 | Mondshine ............ 252/8.55 R |
| 4,186,803 A | 2/1980 | Mondshine ................ 166/292 |
| 4,213,866 A * | 7/1980 | Ashby et al. .............. 507/241 |
| 4,217,229 A * | 8/1980 | Watson .................... 507/216 |
| 4,337,160 A * | 6/1982 | Sample, Jr. ............... 507/140 |
| 4,368,787 A * | 1/1983 | Messenger ................ 175/319 |
| 4,541,485 A | 9/1985 | Block ...................... 166/281 |
| 4,620,596 A | 11/1986 | Mondshine ................ 166/292 |
| 4,780,220 A * | 10/1988 | Peterson .................... 507/107 |
| 5,007,480 A * | 4/1991 | Anderssen ................ 166/292 |
| 5,247,992 A * | 9/1993 | Lockhart ................... 166/301 |
| 5,602,083 A | 2/1997 | Gabrysch et al. .......... 507/200 |
| H1685 H * | 10/1997 | Lau et al. ................... 507/140 |
| 6,090,762 A * | 7/2000 | Clapperton et al. ........ 510/108 |
| 6,140,277 A * | 10/2000 | Tibbles et al. ............. 507/201 |
| 6,180,573 B1 | 1/2001 | Nattier et al. ............. 507/269 |
| 6,211,120 B1 * | 4/2001 | Welch et al. .............. 507/270 |
| 6,290,001 B1 | 9/2001 | West et al. .................. 175/61 |
| 6,548,452 B1 | 4/2003 | Nattier et al. |

FOREIGN PATENT DOCUMENTS

| | | | | |
|---|---|---|---|---|
| WO | WO 95/03140 | 2/1995 | ............ B08B 9/00 |
| WO | WO 2004/003101 | 1/2004 | |

* cited by examiner

*Primary Examiner*—David Bagnell
*Assistant Examiner*—Shane Bomar
(74) *Attorney, Agent, or Firm*—Craig W. Roddy; Haynes and Boone LLP

(57) ABSTRACT

A system and method for removing particles from a well bore penetrating a possible hydrocarbon producing formation, according to which drilling fluid is mixed with a weighted material, and the mixture is introduced into a well bore so that the mixture scours any particles accumulated in the well bore. A well-completion fluid is introduced into the well bore that dissolves the weighted material.

27 Claims, 1 Drawing Sheet

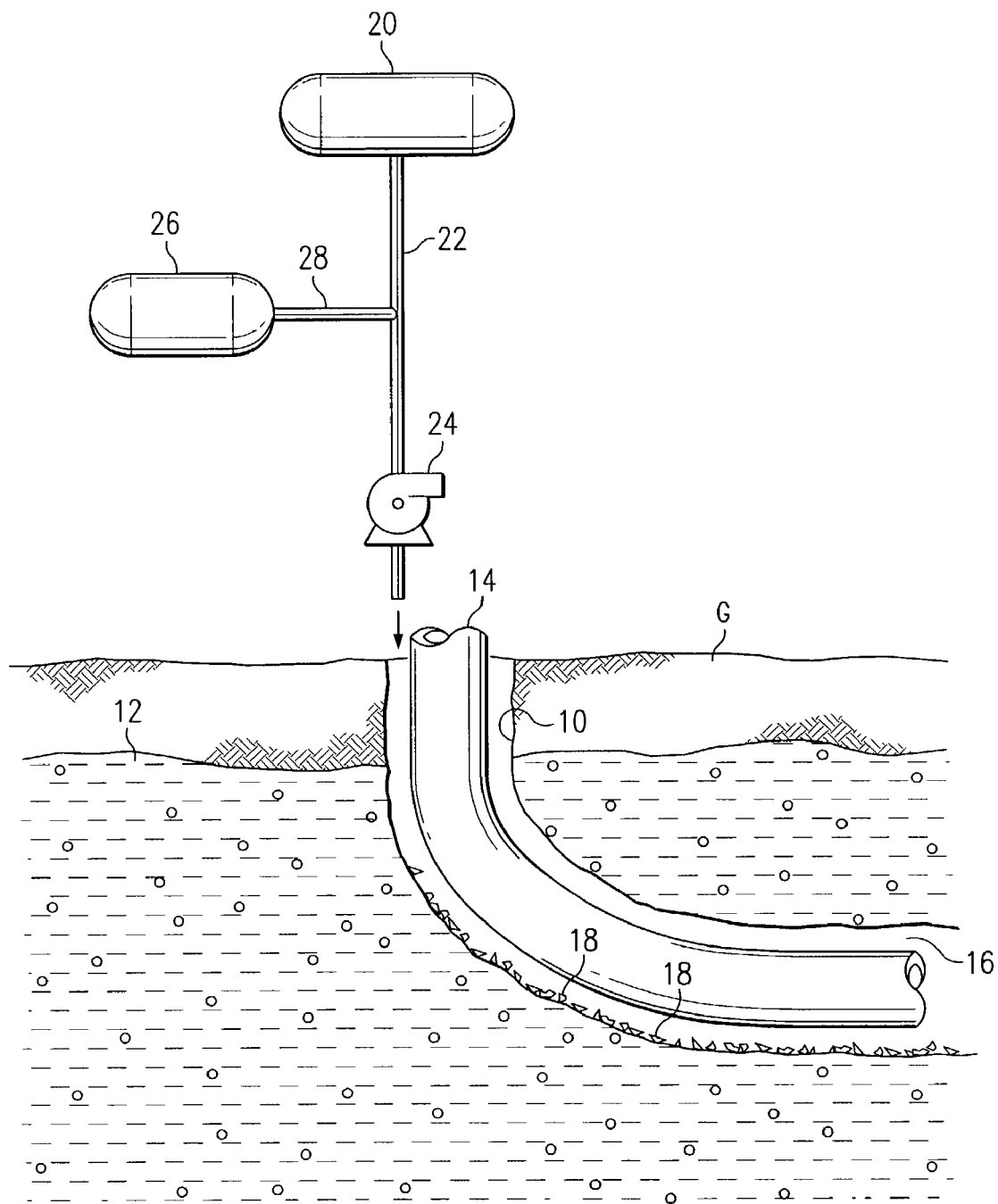

SYSTEM AND METHOD FOR REMOVING PARTICLES FROM A WELL BORE PENETRATING A POSSIBLE PRODUCING FORMATION

BACKGROUND

This invention relates to a system and method for using a weighted sweep material for removing particles from a well bore penetrating a possible hydrocarbon producing formation.

A problem often encountered in well-drilling operations is the accumulation of drilling cuttings, especially on the low side of deviated, or horizontal, well bores. As these cuttings accumulate within the well bore, it is necessary to occasionally pump a volume of drilling fluid that has been weighted to a density higher than the active drilling fluid system in order to clean, or sweep, the well of the drilling cuttings. This "weighted sweep" material, which is often in the form of barite, or the like, is introduced into the well bore with the drilling fluid and scours the low side of the well bore to clean the well bore of cuttings. The weighted sweep material also provides extra buoyancy to mobilize and remove the cuttings from the well bore, and the cuttings are then separated from the weighted sweep material by shaker screens, or the like.

Upon completion of the weighted sweep, the weighted sweep material must be removed from the drilling fluid and taken out of the well bore. However, it is virtually impossible to remove all of the weighted sweep material from the well bore. Thus, some of the material will remain in the well bore and become part of the well formation, which may cause several problems. For example, the presence of the non-removable, weighted sweep material could reduce the permeability of the rock being drilled and cause a distortion of the particle size distribution of the bridging materials in the drilling fluid. Also, the presence of the weighted sweep material makes it difficult, if not impossible, to eliminate some plugging of the permeable zones in the formation. Thus, the rock in the drilled pay zone could be damaged, and thus possibly impede the withdrawal of oil and gas.

Therefore, what is needed is a system and method for removing the cuttings from the well bore without encountering the above problems.

BRIEF DESCRIPTION OF THE DRAWING

The drawing is a diagrammatic view depicting the system of an embodiment of the present invention.

DETAILED DESCRIPTION

According to an embodiment of the invention, and with reference to the drawing, a deviated well bore 10 is formed below ground G and adjacent to an oil or gas reservoir 12. A drill pipe 14 is disposed in the well bore 10 with the outer diameter of the drill pipe being less than the inner diameter of the well bore, or casing, to form an annulus 16.

It will be assumed that, as a result of the well-drilling operation, there is an accumulation of drilling cuttings 18 in the annulus 16, especially on the lower side thereof as shown, which need to be removed for the reasons described above. To this end, a source 20 of drilling fluid, or mud, is pumped into the well bore via a conduit 22 and by a pump 24. A source 26 of a weighted material, to be described in detail, is introduced, via a conduit 28, into the conduit 22 for mixing with the drilling fluid upstream of the well bore 10.

The mixture of fluid and weighted material forms a "weighted sweep" material which is introduced into the annulus 16 at the inlet end of the well bore 10. As the weighted sweep material passes through the annulus 16, it scours the lower side of the well bore 10 to remove the drilling cuttings 18. The mixture of the weighted sweep material and the cuttings is circulated back to the surface for separation and further conventional treatment. However, some of the weighted material remains in the annulus and must be removed for the reasons described above.

One or more well-completion fluids are then introduced into, and flow through, the annulus for various well-completion procedures. These well-completion fluids are conventional and may include mineral acids, organic acids, chelating agents, and ammonium salt solutions.

According to an embodiment of the invention, the weighted material is of a type that will be dissolved by each of the above well-completion fluids, which, after use, are circulated out of the well bore 10. The weighted material preferably is a metal salt. More preferably, the weighted material is an oxide, hydroxide, carbonate, sulfate, phosphate, tungstate, fluoride, pyrophosphate or orthosilicate salt of an alkaline earth metal, a transition metal, especially a transition metal from Period 4 of the Periodic Table of Elements, a metal selected from Groups 13, 14 and 15 of the Periodic Table of Elements or a Lanthanide series rare earth metal. Specific examples of metal salts that are absorbable by the well completion fluids and thus are suitable for use as the weighted material include magnesium oxide, barium pyrophosphate, aluminum hydroxide, calcium fluoride, calcium tungstate, magnesium orthosilicate, iron oxide, iron tungstate, manganese oxide, manganese carbonate, manganese tungstate, manganese hydroxide, iron hydroxide, zinc oxide, zinc carbonate, zinc phosphate, zinc sulfate, lanthanum hydroxide, cerium hydroxide, lanthanum oxide, bismuth oxide, hydroxylapatite (hydrated calcium phosphate), anhydrite (calcium sulfate), dolomite (calcium magnesium carbonate), copper oxide, tin oxide, strontium carbonate, and strontium phosphate

EXAMPLE

A weighted material, having a specific gravity of greater than 2.6, is passed from the source 26 into the conduit 22 where it mixes with drilling fluid from the source 20, which drilling fluid can be in a mud-like form. This forms a weighted sweep material with a fluid weight of approximately 2 to 4 pounds per gallon greater than the drilling fluid in the annulus. The weighted sweep material is pumped into the annulus 16 by the pump 24, and scours the lower side of the well bore 10 to remove the drilling cuttings 18. The mixture of the weighted sweep material and the cuttings is then circulated back to the ground surface for separation, and/or further treatment and some of the weighted sweep material accumulates in the annulus 16. Well-completion fluids are then circulated through the annulus 16 in connection with various conventional well-completion operations well known to those skilled in the art.

Since the weighted sweep material is soluble in the well completion fluids mentioned above, when the latter fluids are circulated through the annulus 16 as described above, the weighted sweep material is dissolved and removed by the fluids. Thus, the annulus is void of the weighted material and the permeability of the rock drilled through during the drilling operation is not reduced, while plugging of the permeable zones in the formation is eliminated, thus eliminating the problems discussed above.

VARIATIONS

It is understood that the above embodiment is not limited to the particular well bore described and shown herein, but is equally applicable to horizontal bores and vertical bores. Also, the embodiment is not limited to the use of one weighted material described above, but rather two or more weighted materials of the above type can be mixed before being introduced into the conduit 22. Further, the expression "drilling fluid" is meant to cover fluids and muds. Moreover, the fluid that dissolves the weighted material does not have to be a "well-completion" fluid but can be any fluid that dissolves the weighted material. Still further, although the expression "well bore" has been used herein, it is understood that it is meant to cover casings, pipe, strings, conduits, or any other type of device capable of transferring fluids.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A method comprising:
   drilling a well bore in a formation;
   introducing into the well bore a mixture comprising drilling fluid and a weighted material comprising a metal salt comprising a salt portion and a metal portion, wherein the salt portion is selected from the group consisting of oxide, hydroxide, carbonate, sulfate, phosphate, tungstate, fluoride, pyrophosphate and orthosilicate, and the metal portion is selected from the group consisting of Group 13, 14 and 15 metals and Lanthanide series rare earth metals;
   removing particles from the well bore by circulating the mixture with the particles therein, out of the well bore; and
   dissolving weighted material that remained in the well bore after the removing of the particles by introducing a second fluid into the well bore, which second fluid dissolves the weighted material.

2. The method of claim 1 wherein the weighted material is further selected from the group consisting of aluminum hydroxide, lanthanum hydroxide, cerium hydroxide, lanthanum oxide, bismuth oxide and tin oxide.

3. The method of claim 1 wherein the second fluid is selected from the group consisting of mineral acids, organic acids, chelating agents and ammonium salt solutions.

4. The method of claim 1 wherein the weighted material has a specific gravity greater than 2.6.

5. The method of claim 1 wherein the weighted material comprises an oxide salt of a metal selected from the group consisting of Group 13, Group 14 and Group 15.

6. The method of claim 1 wherein the weighted material comprises a hydroxide salt of a metal selected from the group consisting of Group 13, Group 14 and Group 15.

7. The method of claim 1 wherein the weighted material comprises a carbonate salt of a metal selected from the group consisting of Group 13, Group 14 and Group 15.

8. The method of claim 1 wherein the weighted material comprises a sulfate salt of a metal selected from the group consisting of Group 13, Group 14 and Group 15.

9. The method of claim 1 wherein the weighted material comprises a phosphate salt of a metal selected from the group consisting of Group 13, Group 14 and Group 15.

10. The method of claim 1 wherein the weighted material comprises a tungstate salt of a metal selected from the group consisting of Group 13, Group 14 and Group 15.

11. The method of claim 1 wherein the weighted material comprises a fluoride salt of a metal selected from the group consisting of Group 13, Group 14 and Group 15.

12. The method of claim 1 wherein the weighted material comprises a pyrophosphate salt of a metal selected from the group consisting of Group 13, Group 14 and Group 15.

13. The method of claim 1 wherein the weighted material comprises a orthosilicate salt of a metal selected from the group consisting of Group 13, Group 14 and Group 15.

14. The method of claim 1 wherein the weighted material comprises an oxide salt of a metal selected from the group consisting of Lanthanide series rare earth metals.

15. The method of claim 1 wherein the weighted material comprises a hydroxide salt of a metal selected from the group consisting of Lanthanide series rare earth metals.

16. The method of claim 1 wherein the weighted material comprises a carbonate salt of a metal selected from the group consisting of Lanthanide series rare earth metals.

17. The method of claim 1 wherein the weighted material comprises a sulfate salt of a metal selected from the group consisting of Lanthanide series rare earth metals.

18. The method of claim 1 wherein the weighted material comprises a phosphate salt of a metal selected from the group consisting of Lanthanide series rare earth metals.

19. The method of claim 1 wherein the weighted material comprises a tungstate salt of a metal selected from the group consisting of Lanthanide series rare earth metals.

20. The method of claim 1 wherein the weighted material comprises a fluoride salt of a metal selected from the group consisting of Lanthanide series rare earth metals.

21. The method of claim 1 wherein the weighted material comprises a pyrophosphate salt of a metal selected from the group consisting of Lanthanide series rare earth metals.

22. The method of claim 1 wherein the weighted material comprises an orthosilicate salt of a metal selected from the group consisting of Lanthanide series rare earth metals.

23. A system for removing particles from a well bore comprising:
   a mixture comprising drilling fluid and a weighted material comprising a metal salt, wherein the salt portion is selected from the group of oxide, hydroxide, carbonate, sulfate, phosphate, tungstate, fluoride, pyrophosphate and orthosilicate, and the metal portion is selected from the group consisting of Group 13, 14 and 15 metals and Lanthanide series rare earth metals;
   means for circulating the mixture through a well bore such that the mixture removes particles accumulated in the well bore; and
   a second fluid that, when introduced into the well bore, dissolves the weighted material that was introduced into the well bore in the mixture.

24. The system of claim 23 wherein the weighted material is further selected from the group consisting of aluminum hydroxide, lanthanum hydroxide, cerium hydroxide, lanthanum oxide, bismuth oxide and tin oxide.

25. The system of claim 23 wherein the second fluid is selected from the group consisting of mineral acids, organic acids, chelating agents and ammonium salt solutions.

26. The system of claim 23 wherein the second fluid, with the dissolved weighted material, is passed out of the well bore.

27. The system of claim 23 wherein the weighted material has a specific gravity greater than 2.6.

* * * * *